United States Patent
Porter et al.

(10) Patent No.: US 8,632,722 B2
(45) Date of Patent: Jan. 21, 2014

(54) BOTTLE WITH EXTENDED NECK FINISH AND METHOD OF MAKING SAME

(75) Inventors: Randal Porter, Norcross, GA (US); Neal Thomas, Lawrenceville, GA (US)

(73) Assignee: Silgan Plastics LLC, Chesterfield, MO (US)

( * ) Notice: Subject to any disclaimer, the term of this patent is extended or adjusted under 35 U.S.C. 154(b) by 860 days.

(21) Appl. No.: 12/328,696

(22) Filed: Dec. 4, 2008

(65) Prior Publication Data

US 2009/0085261 A1   Apr. 2, 2009

Related U.S. Application Data

(62) Division of application No. 11/075,932, filed on Mar. 8, 2005, now abandoned.

(51) Int. Cl.
*B29C 39/02* (2006.01)
*B29C 43/02* (2006.01)
*B29C 49/00* (2006.01)

(52) U.S. Cl.
USPC ............ 264/535; 264/500; 264/523; 264/537

(58) Field of Classification Search
USPC ......... 264/523, 535, 537, 539, 500, 519, 520, 264/521; 425/522, 526, 533, 534
See application file for complete search history.

(56) References Cited

U.S. PATENT DOCUMENTS

| | | |
|---|---|---|
| 3,347,420 A | 10/1967 | Donoghue |
| 3,581,953 A | 6/1971 | Donoghue |
| 3,628,700 A | 12/1971 | Donoghue |
| 4,070,140 A | 1/1978 | Lucas et al. |
| 4,201,316 A | 5/1980 | Klingaman |
| 4,451,426 A | 5/1984 | Branchadell |
| 4,487,568 A * | 12/1984 | Wiatt et al. ................... 425/534 |
| 4,603,831 A * | 8/1986 | Krishnakumar et al. ..... 249/144 |
| D288,662 S | 3/1987 | Obuchowski |
| 4,646,925 A | 3/1987 | Nohara |
| 4,671,763 A * | 6/1987 | Weiler ........................ 425/525 |
| 4,715,504 A | 12/1987 | Chang et al. |
| 4,818,575 A * | 4/1989 | Hirata et al. ................ 428/36.7 |
| D304,681 S | 11/1989 | Metaxa |
| 4,954,376 A | 9/1990 | Krishnakumar et al. |
| D310,963 S | 10/1990 | Segati |
| 4,971,226 A | 11/1990 | Donoghue |

(Continued)

OTHER PUBLICATIONS

U.S. Appl. No. 12/003,300, filed Dec. 21, 2007, Begley et al.

(Continued)

*Primary Examiner* — Atul P. Khare
(74) *Attorney, Agent, or Firm* — Reinhart Boerner Van Deuren s.c.

(57) ABSTRACT

A blow molded synthetic resin bottle has a body and an elongated neck with the body providing a shoulder extending about the base of the neck. The neck has a first collar extending thereabout spaced adjacent the shoulder and at least one additional collar extending thereabout adjacent the upper end of the neck. The resin in the neck is substantially unoriented. To produce the bottle, a synthetic resin preform is injection molded with a generally tubular body and the elongated neck. This preform is placed in a blow mold cavity having a body receiving portion and a neck receiving portion that has a recess extending thereabout seating the first collar therein. The additional collar is disposed outwardly of the mold cavity and is disposed on the upper surface of the mold.

18 Claims, 9 Drawing Sheets

(56) References Cited

U.S. PATENT DOCUMENTS

| | | |
|---|---|---|
| D313,935 S | 1/1991 | Miller |
| D316,815 S | 5/1991 | Kalin et al. |
| 5,049,349 A * | 9/1991 | McCullough et al. ........ 264/515 |
| D321,651 S | 11/1991 | Cochran |
| D321,829 S | 11/1991 | Iazzetta |
| D323,617 S | 2/1992 | Miller |
| 5,122,325 A | 6/1992 | Bartley et al. |
| D336,046 S | 6/1993 | Donoghue |
| 5,330,081 A | 7/1994 | Davenport |
| 5,364,585 A | 11/1994 | Takeuchi |
| D353,324 S | 12/1994 | Rice, III |
| D356,502 S | 3/1995 | Poandl |
| D357,416 S | 4/1995 | Valentine |
| D360,363 S | 7/1995 | Minale |
| D360,831 S | 8/1995 | Boisset |
| 5,447,766 A | 9/1995 | Orimoto et al. |
| 5,588,544 A | 12/1996 | Takashima et al. |
| D379,765 S | 6/1997 | Hencher |
| D387,993 S | 12/1997 | Workman et al. |
| D388,712 S | 1/1998 | Lyngdal et al. |
| 5,780,130 A | 7/1998 | Hansen et al. |
| D400,434 S | 11/1998 | Amos et al. |
| 5,888,598 A | 3/1999 | Brewster et al. |
| 5,918,752 A | 7/1999 | Meyer |
| 6,082,565 A | 7/2000 | Harrold |
| 6,209,762 B1 | 4/2001 | Haffner et al. |
| D450,597 S | 11/2001 | Bobchenok et al. |
| 6,312,641 B1 | 11/2001 | Hutchinson |
| D452,159 S | 12/2001 | Belser et al. |
| 6,382,954 B1 | 5/2002 | Mai |
| 6,568,156 B2 | 5/2003 | Silvers et al. |
| 6,572,812 B2 | 6/2003 | Collette et al. |
| D484,419 S | 12/2003 | Potocki et al. |
| 6,673,303 B2 | 1/2004 | White et al. |
| 6,681,548 B2 | 1/2004 | Silvers et al. |
| D486,072 S | 2/2004 | Potocki et al. |
| 6,709,624 B2 | 3/2004 | Lisch et al. |
| D498,144 S | 11/2004 | Illenberger et al. |
| D505,079 S | 5/2005 | Mulder et al. |
| 6,890,621 B2 | 5/2005 | Nakamura et al. |
| D511,460 S | 11/2005 | Deubel et al. |
| D512,316 S | 12/2005 | Illenberger et al. |
| 2002/0037338 A1 * | 3/2002 | Lisch et al. ................... 425/525 |
| 2003/0077349 A1 * | 4/2003 | Derouault et al. ............. 425/145 |
| 2009/0159482 A1 | 6/2009 | Begley et al. |

OTHER PUBLICATIONS

Office Action for U.S. Appl. No. 12/003,300, mail date Sep. 10, 2009, 15 pages.
Office Action for U.S. Appl. No. 12/003,300, mail date Feb. 25, 2010, 13 pages.

* cited by examiner

BOTTLE WITH EXTENDED NECK FINISH AND METHOD OF MAKING SAME

CROSS-REFERENCE TO RELATED PATENT APPLICATIONS

This application is a divisional of prior application Ser. No. 11/075,932, filed Mar. 8, 2005, which is incorporated herein by reference in its entirety.

BACKGROUND OF THE INVENTION

The present invention relates to blow molded bottles having an elongated neck finish and to a method for making same.

Blow molded synthetic resin bottles generally have a body and a neck finish to receive a closure. They are produced in molds by blowing a heated injection molded preform outwardly against the walls of a mold cavity.

When the resin of the preform is orientable, the blow molding of the preform outwardly, both radially and longitudinally, against the walls defining the mold cavity produces orientation of the molecules of the resin. However, it is desirable to have the mold cavity snugly seat the neck finish so that it retains its molded dimensions and unoriented structure.

For some applications, bottles with neck finishes of substantial length are desired and this can produce problems when using standard automated equipment. The clearance above the mold may be limited so as to preclude the conventional preform neck finish having a positioning and gripping collar adjacent its lower end which seats on the outer surface of the mold. The preform is generally deposited in the mold cavity by a gripper which engages the collar on the neck finish and that collar seats on the upper surface of the mold to position the preform properly within the mold cavity.

It is an object of the present invention to provide a novel synthetic resin bottle having an extended neck finish.

It is also an object to provide such a bottle which can be readily fabricated in existing blow molding equipment.

Another object is to provide a novel method for making synthetic resin blow molded bottles with extended neck finishes.

SUMMARY OF THE INVENTION

It has now been found that the foregoing and related objects may be attained in a blow molded synthetic resin bottle having a body and a neck finish. The body provides a shoulder extending about the base of the neck finish. Generally, the neck finish is elongated and may have a first collar extending thereabout adjacent the shoulder. The neck finish also has at least one additional collar extending thereabout adjacent its upper end. The resin in the first collar and in the remainder of the neck finish thereabove is substantially unoriented.

Generally, the neck portion has a thread formation thereabout above the at least one additional collar, and the first collar may be provided with lugs configured and dimensioned to cooperate with a child-resistant cap which engages therewith. Desirably, the first collar has an upper portion of substantially the same diameter as the other collar and a lower portion of larger diameter. The upper portion may have circumferentially spaced lugs to provide engagement with a child-resistant cap. Preferably, the other collar comprises a pair of axially spaced rings adapted to seat a carrier arm or gripper therebetween.

In the method for making the synthetic resin blow molded bottles, a synthetic resin preform is injection molded with a generally tubular body portion and a neck finish. The neck finish will generally have the first collar adjacent the body portion and a second collar adjacent the upper end portion of the neck finish. The preform is heated and placed in a blow mold cavity having a body receiving portion and a neck finish receiving portion which includes a recess extending thereabout and seating the first collar therein. The additional collar is disposed outwardly of the mold cavity and seats on the upper surface of the mold.

The body portion of the preform is blown into conformity with the walls of the body portion of the cavity to provide a blow molded synthetic resin bottle having a body and a neck finish.

DETAILED DESCRIPTION OF THE PREFERRED EMBODIMENTS

Figure 1:
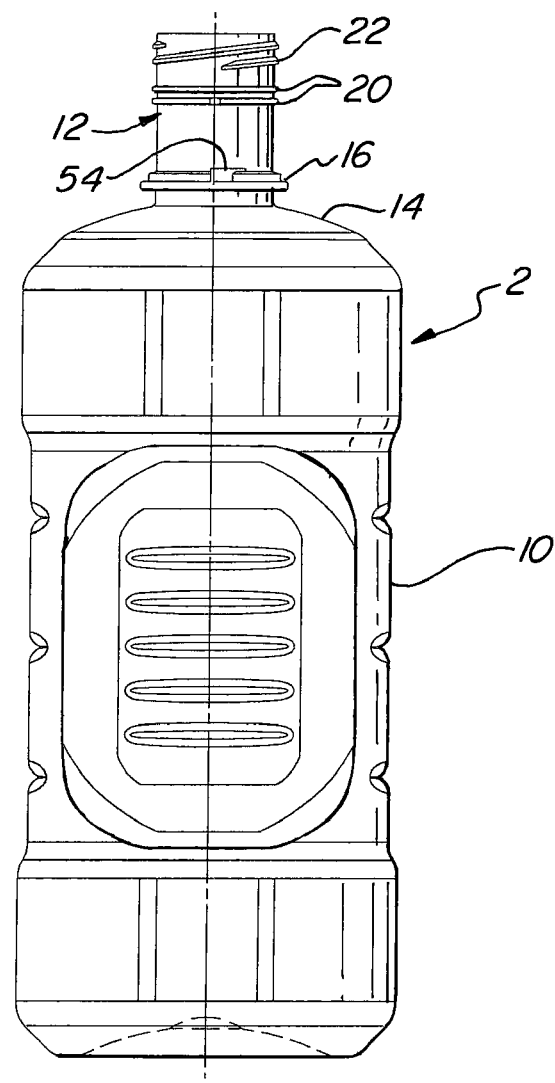
FIG. 1 is a perspective view of a bottle with an extended neck finish embodying the present invention.

Turning first to FIG. 1, a bottle generally designated by the numeral 2 and embodying the present invention has an elongated cylindrical body 10 and an extended neck finish generally designated by the numeral 12. Adjacent the shoulder portion 14 at the upper end of the body 10 is a first collar 16 on the neck finish 12. A second collar generally designated by the numeral 18 and comprising a pair of axially spaced transfer rings 20 is provided adjacent the upper end of the neck finish 12. Spaced above the second collar 18 are thread formations 22 which will engage with cooperating formations on the closure (not shown).

Figure 2:
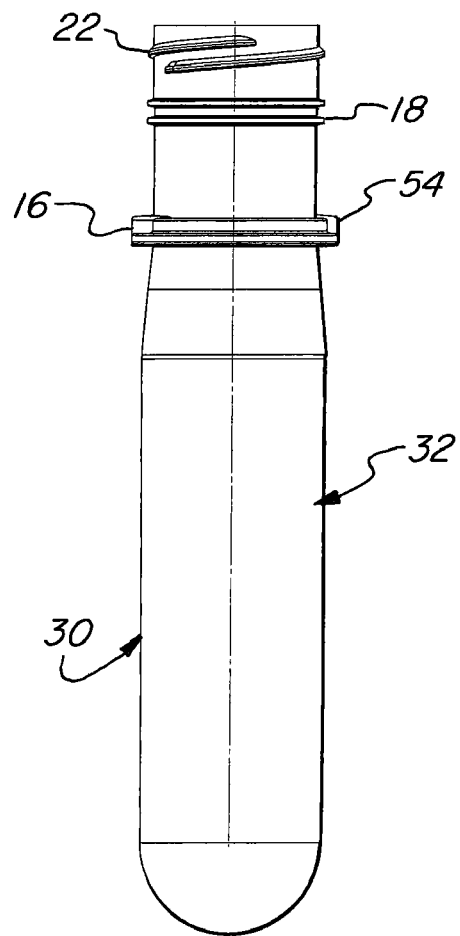
FIG. 2 is a side elevational view of the preform to produce the bottle of FIG. 1.

Turning next to FIG. 2, a hollow preform generally designated by the numeral 30 is molded with the desired neck finish shown in FIG. 1 and an elongated, generally tubular body portion 32.

Figure 3:
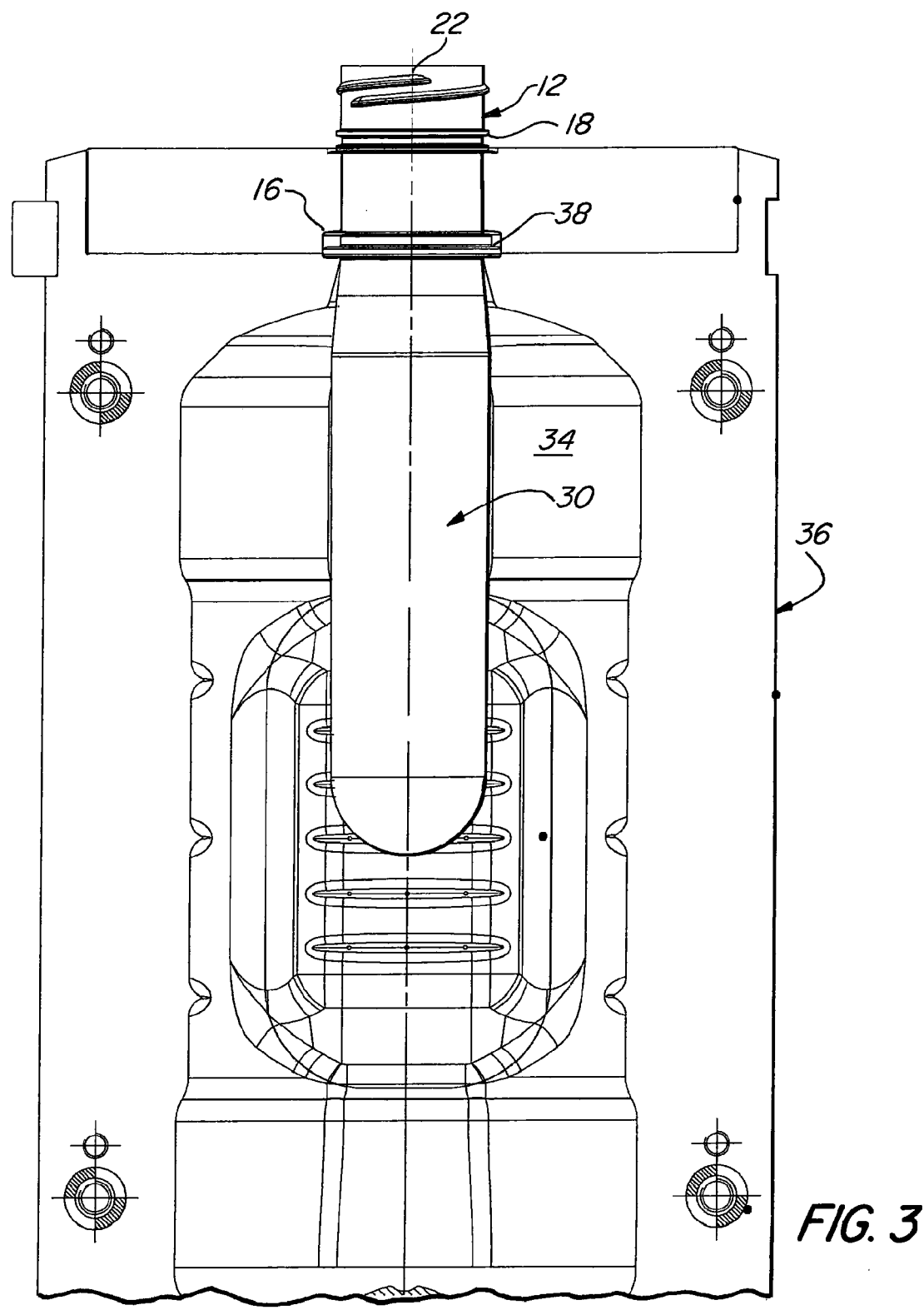
FIG. 3 is a fragmentary view of the preform for the bottle of FIG. 1 seated in a blow mold shown in section.
Figure 4A:
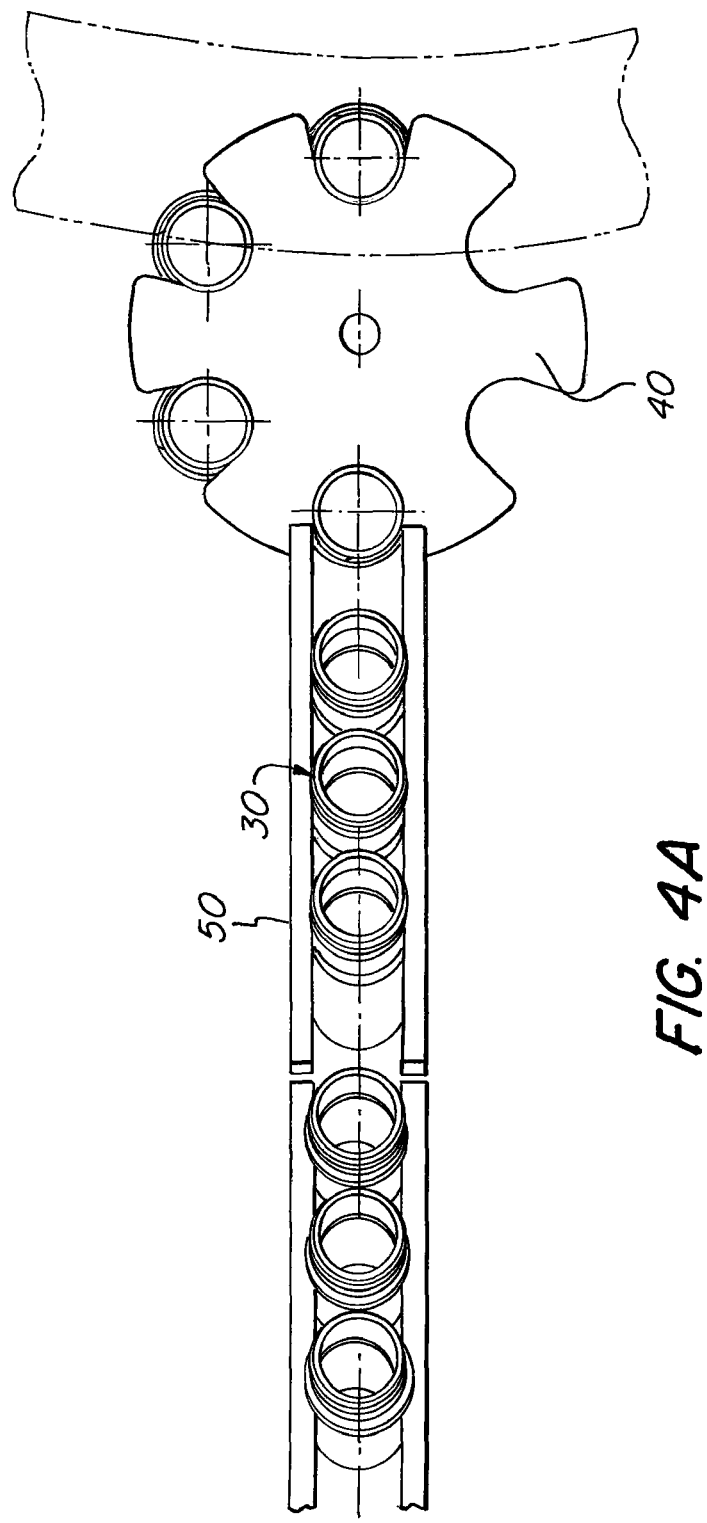
FIG. 4a is a diagrammatic top view of preforms being fed on a pair of rails into, and seated in, an infeed wheel.
Figure 4B:
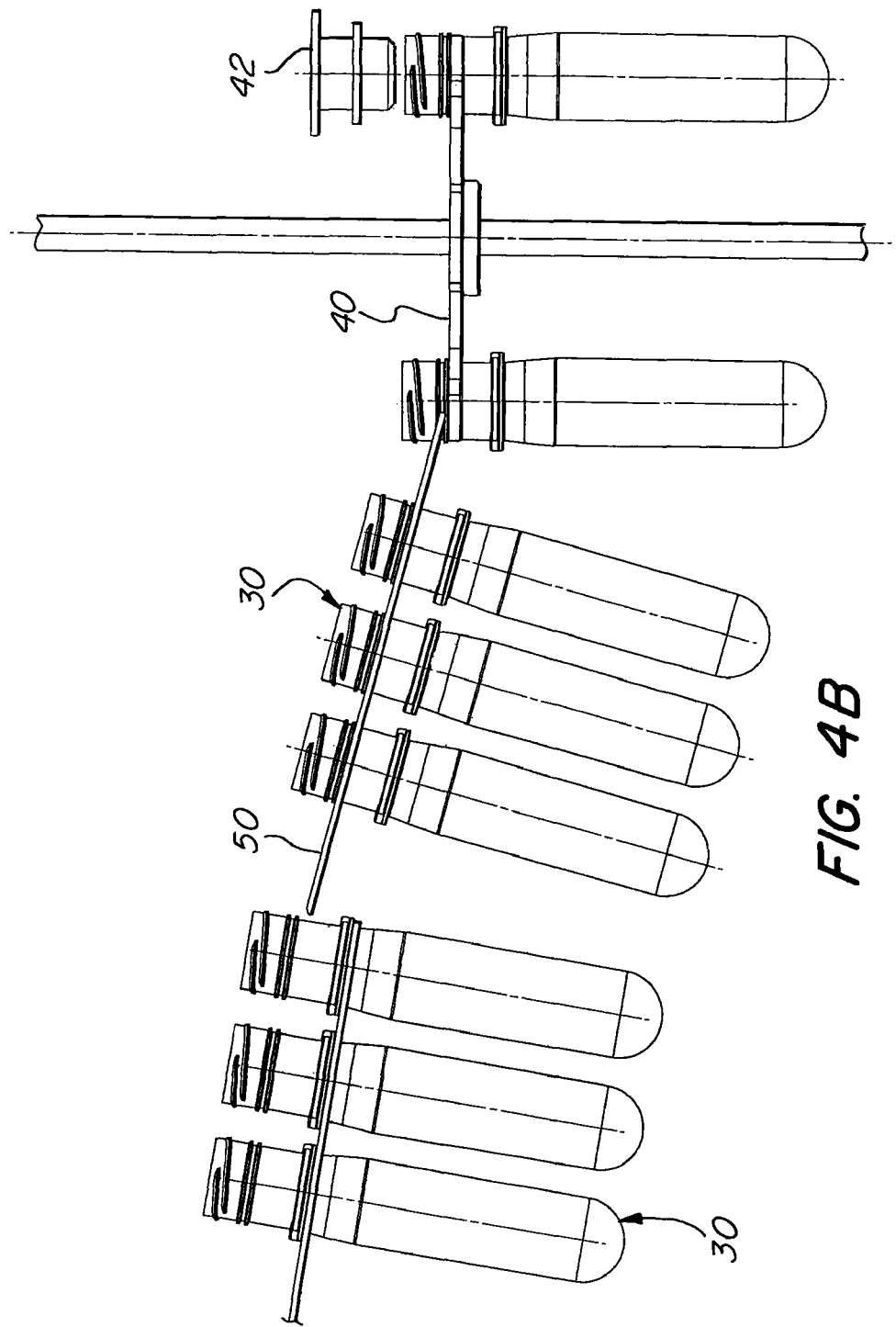
FIG. 4b is a diagrammatic side view of the preforms being moved along infeed rails to the infeed wheel and a spindle about to be inserted into a preform.
Figure 5:
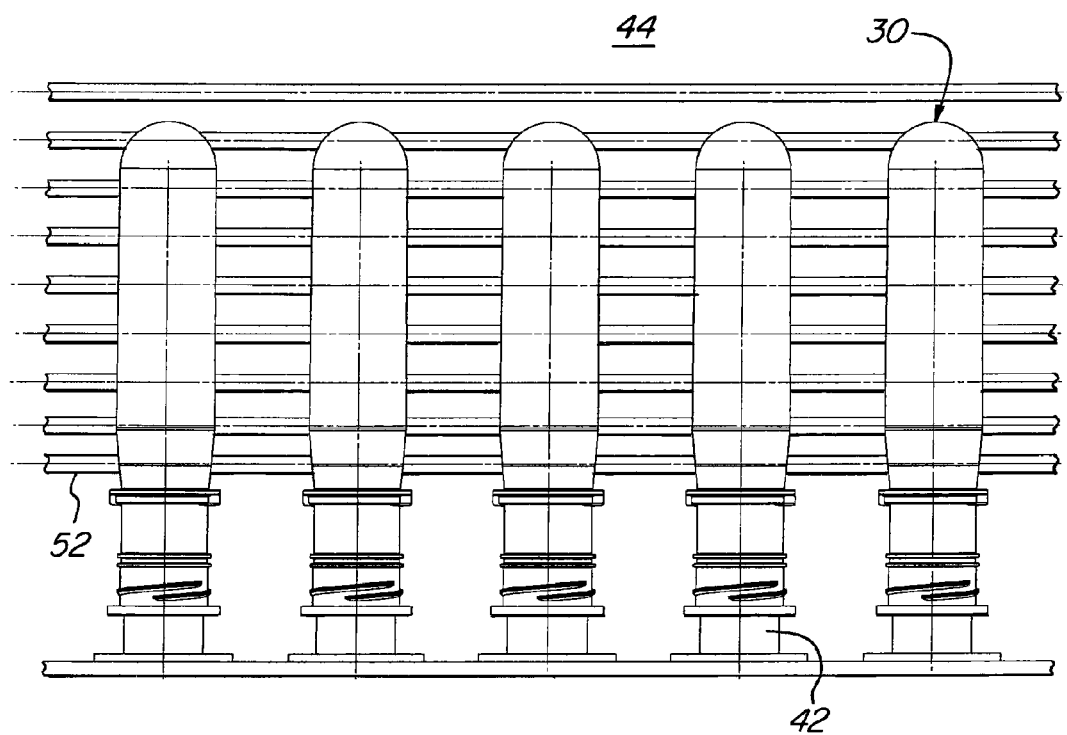
FIG. 5 is a diagrammatic view of the preforms being carried on spindles through a heating chamber.
Figure 6:
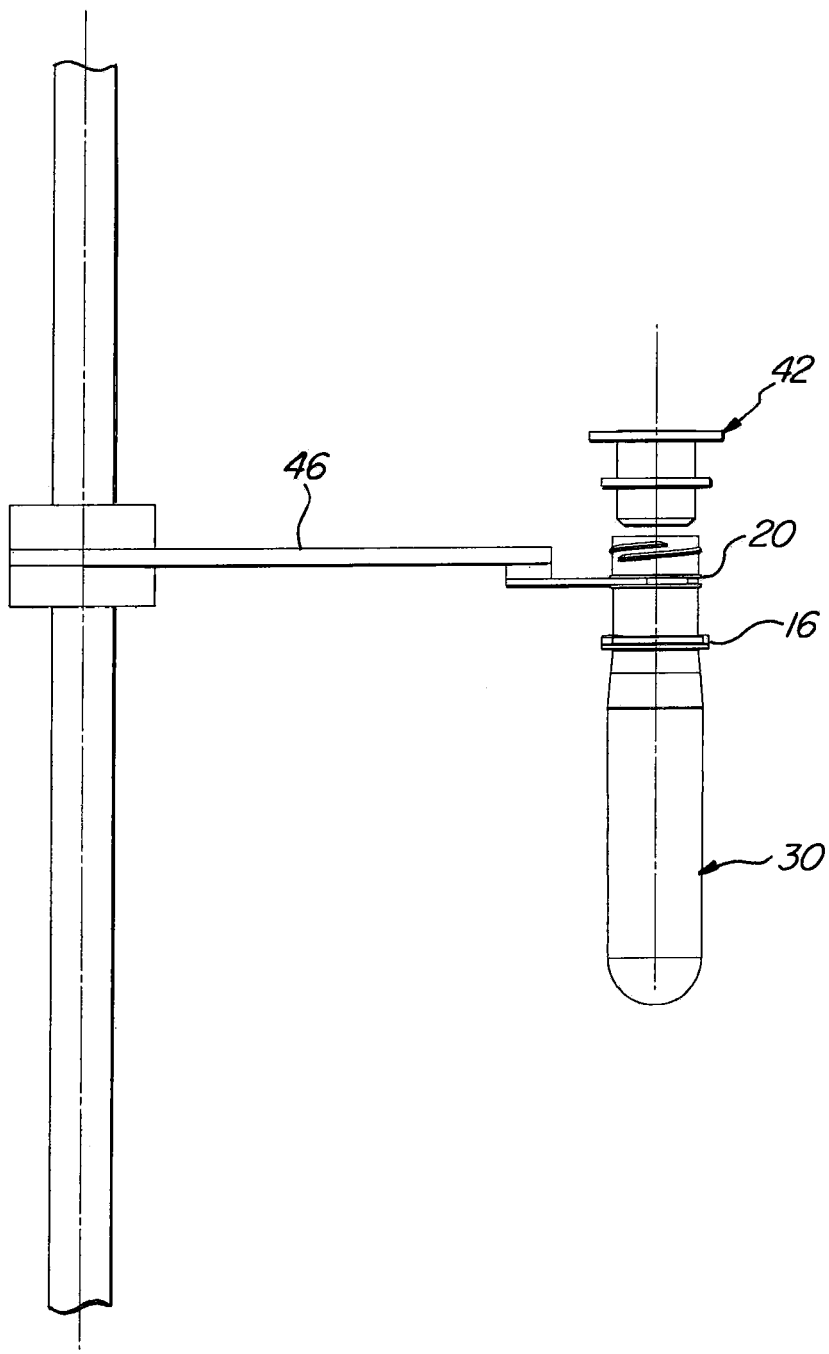
FIG. 6 is a diagrammatic view of the preform disposed in a gripper and the spindle being withdrawn therefrom.
Figure 7:
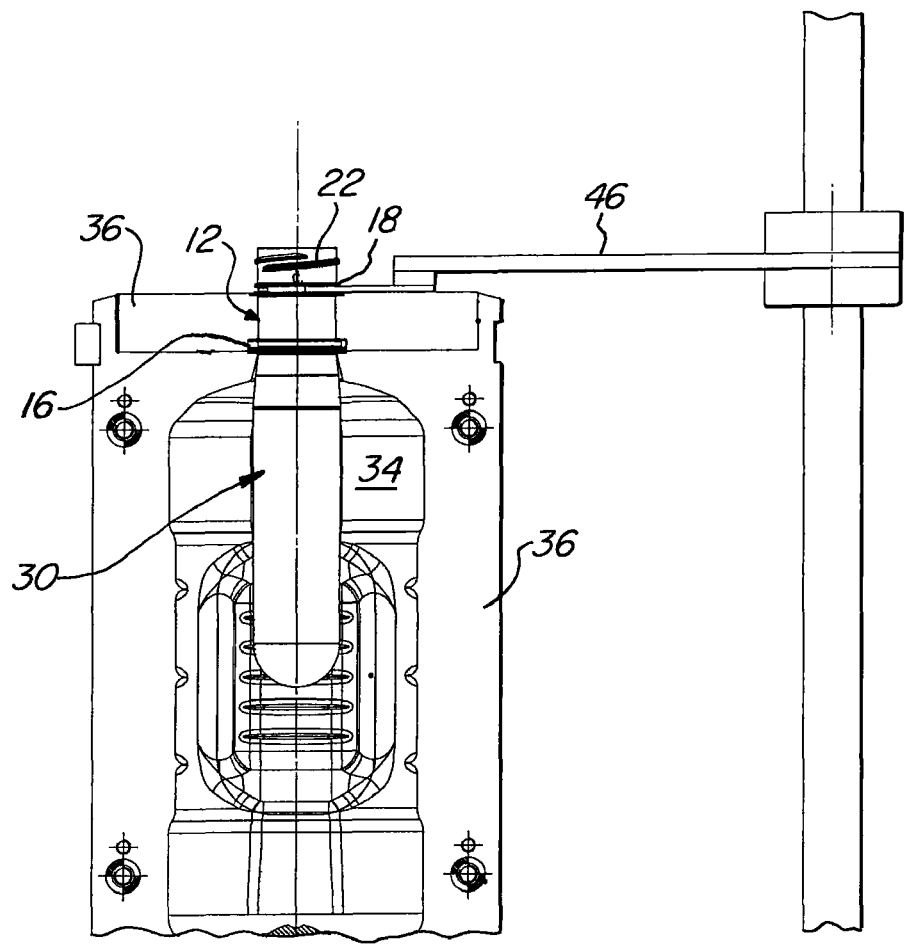
FIG. 7 is a diagrammatic illustration of the preform being deposited in the mold by the gripper.
Figure 8:
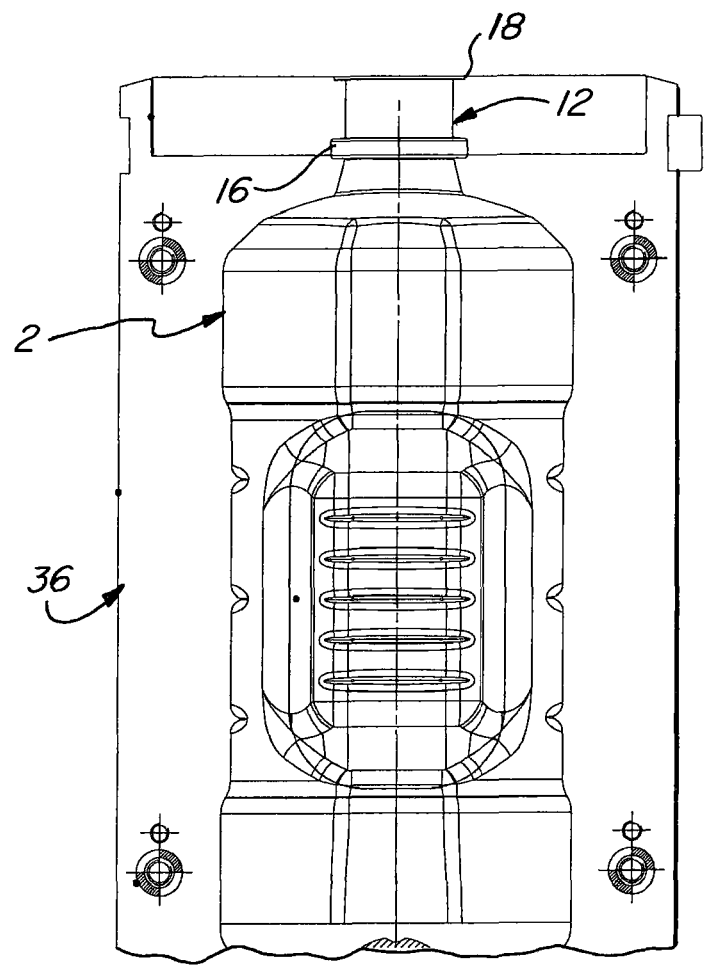
FIG. 8 is a sectional view of the mold showing the bottle formed by blowing the heated preform.

As seen in FIG. 3, the preform 30 is placed in the cavity 34 of a blow mold generally designated by the numeral 36 and the lower portion of the neck finish 12 including the first collar 16 is seated in the mold cavity 34. The cavity 34 has a circumferential recess 38 in which the first collar 16 is seated. The upper portion of the neck finish 12 including the second collar 18 and thread formations 22 are disposed above the mold 36.

In the process of molding the bottle of the present invention as seen in FIGS. 4-7, the molded preforms 30 are fed along rails 50 and loaded into an infeed wheel 40 which is at the same level as the top surface of the mold 36. A spindle nose 42 is moved downwardly into the neck finish 12 of the preform 30, and it carries the preform 30 through an oven 44 in which it is conditioned by the heat lamps 52. The neck finish 12 is desirably shielded as the preform passes through the oven 44 and the spindle nose 42 is rotated to rotate the preform 30 to provide uniform heating. When the preform 30 exits the oven 44, the neck finish 12 is disposed upwardly. At the end of the oven 44, a gripper 46 engages the preform neck finish 12 between the transfer rings 20 of the second collar 18, and the spindle nose 42 is withdrawn therefrom and moved upwardly. The gripper 46 carries the preform 30 to the mold 36 and deposits the preform 30 in the mold cavity 34 with the second collar 18 being disposed above and seating on the top surface of the mold 36 which is then closed about the preform 30. Following the blow and cool cycle, the finished bottle 2 is removed from the mold 36.

In the illustrated embodiment, the lower collar 16 has a stepped configuration with the upper step being of lesser diameter and providing a pair of lugs 54 which cooperate with a closure (not shown) to provide a child-proof and/or tamper-evident bottle.

As is well known, some resins can be oriented to provide greater strength in smaller thicknesses, and polyethylene terephthalate (PET) resins are widely employed. However, polyolefins and other non-orientable resins are also blow molded.

Since the neck finish must be formed to relatively close tolerances to mate securely and seal with a closure, it is desirable to mold the desired neck finish as a part of the preform. To avoid distortion of the neck finish during the blow molding of the bottle body, most of the neck finish is seated in a closely conforming cavity in the mold so that it will not be expanded during the blowing operation.

To facilitate transfer of the preform from the injection molding machine and proper positioning in the blow mold, the second collar is formed on the neck finish adjacent its upper end. This collar can ride on a pair of rails for movement from the molding station to the blowing station. It is also engageable by a gripper for controlled movement of the preform, and it seats on the mold or in a cooperating recess in the mold cavity.

In the illustrated embodiment, this grippable and positioning collar is provided by a pair of axially spaced flanges and the gripper engages between them. However, a single circumferential flange may be employed, desirably with a groove immediately thereabove to seat the gripper.

Because of the elongated neck finish, this collar and the closure may be encircled by a shrink wrapped band in the filled bottle to create a tamper evident seal.

Thus, it can be seen that bottles with extended neck finishes can be readily produced by providing molds which have a cavity configured to receive the lower portion of the elongated neck finish including a collar spaced closely to the shoulder on the body of the bottle. The upper or second collar is positioned to be disposed above the upper surface of the mold, and the protruding upper portion of the neck finish is within the vertical clearance provided in most conventional blow molding equipment.

What is claimed is:

1. A method for making a container comprising:
    molding a preform having a closed body and a neck extending from the closed body to an opening in the preform, the neck including a thread formation located adjacent to the opening and a collar located between the thread formation and the closed body, the opening having a diameter and the neck having a length greater than the diameter of the opening;
    providing a mold having a body receiving portion and a neck receiving portion, the neck receiving portion including a circumferential recess;
    engaging the preform between the thread formation and the collar with a gripper to move the closed body of the preform into the mold, the closed body being separated from the threaded formation by the gripper and the collar;
    closing the mold while the preform is supported by the gripper such that the closed body of the preform is received within a closed body receiving portion of the mold, the collar of the preform is seated within the circumferential recess of the neck receiving portion, and the thread formation and gripper are located outside of the closed body receiving portion, whereby more than half of the neck is seated in the neck receiving portion of the closed mold; and
    inflating the closed body of the preform into conformity with walls of the body receiving portion.

2. The method of claim 1, further comprising conditioning the preform prior to moving the closed body of the preform into the mold.

3. The method of claim 1, wherein the gripper contacts an outer surface of the mold when the closed body of the preform is moved into the mold.

4. The method of claim 1, wherein the thread formation is configured to engage with corresponding threads of a closure.

5. The method of claim 1, wherein the preform is formed by injection molding and the body of the preform is heated before being moved into the body receiving portion.

6. A method for making a container comprising:
    molding a preform from a thermoplastic material, the preform having a closed body and a neck extending from the closed body to a preform opening, the neck having threads adjacent to the opening and a collar adjacent to the closed body, the opening having a diameter and the neck having a length greater than the diameter;
    heating the closed body while shielding the neck from the heating;
    supporting the preform between the threads and the collar with a gripper;
    placing the collar and the closed body in a mold closeable to form a cavity and a collar recess, the cavity having walls defining a shape of the container after blow molding;
    closing the mold such that the closed body is located in the cavity, the collar recess engages the collar to support the collar and retain a shape of the collar during blow molding, the threads and gripper are located outside of the closed mold, and less than half of the neck is located outside of the closed mold; and
    blow molding by pressurizing the closed body of the preform to expand the closed body into conformity with the cavity walls and provide a container having an expanded body portion and a neck which is not distorted between the collar and the opening.

7. The method of making a container of claim 6, wherein the preform is injected molded.

8. The method of making a container of claim 6, further comprising the step of rotating the preform during heating.

9. A method for making a container comprising:
    molding a preform having a closed body and a neck extending from the closed body to an opening in the preform, the neck including a thread formation located adjacent to the opening, a collar located between the thread formation and the closed body, and a pair of transfer rings located between the thread formation and the collar, the neck having a length and the opening having a diameter less than the length;

supporting the preform between the transfer rings to locate the closed body and the collar of the preform into an open blow mold having a body receiving portion and collar recess;

closing the blow mold such that the collar recess engages the collar while the preform remains supported outside of the blow mold cavity, a portion of the neck located outside of the mold being less than half of the length of the neck; and blow molding by pressurizing the preform to move the closed body of the preform into conformity with walls of the body receiving portion of the cavity and produce a container having an expanded closed body portion and a neck portion which is not distorted from the shape of the neck portion of the preform prior to blow molding.

10. The method of claim 9, wherein the preform is injection molded.

11. The method of claim 9, wherein said molding of the preform produces the thread formation on the neck adjacent to the transfer rings.

12. The method of claim 9, wherein the collar and at least one transfer ring have relatively similar diameters.

13. The method of claim 9, wherein at least one of either the transfer rings or the collar includes lugs configured to engage a child-resistant cap.

14. The method of claim 9, wherein the transfer rings are axially spaced to accept a carrier arm therebetween.

15. The method of claim 9, wherein the body of the preform has a relatively tubular shape.

16. The method of claim 9, wherein the preform is made of synthetic resin.

17. The method of claim 16, wherein the synthetic resin of the neck portion of the container is relatively unoriented.

18. The method of claim 16, wherein the synthetic resin is polyethylene terephthalate.

\* \* \* \* \*